US011691480B2

(12) United States Patent
Pierres et al.

(10) Patent No.: US 11,691,480 B2
(45) Date of Patent: Jul. 4, 2023

(54) HOUSING FOR A HEATING, VENTILATION AND/OR AIR CONDITIONING DEVICE OF A MOTOR VEHICLE

(71) Applicant: Valeo Systemes Thermiques, Le Mesnil Saint Denis (FR)

(72) Inventors: Philippe Pierres, Le Mesnil Saint-Denis (FR); Nestor Varela, Le Mesnil Saint-Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 0 days.

(21) Appl. No.: 17/273,581

(22) PCT Filed: Sep. 3, 2019

(86) PCT No.: PCT/FR2019/052024
§ 371 (c)(1),
(2) Date: Mar. 4, 2021

(87) PCT Pub. No.: WO2020/049250
PCT Pub. Date: Mar. 12, 2020

(65) Prior Publication Data
US 2021/0323386 A1 Oct. 21, 2021

(30) Foreign Application Priority Data

Sep. 7, 2018 (FR) ...................... 1858036

(51) Int. Cl.
*B60H 3/06* (2006.01)
*B60H 1/00* (2006.01)
(52) U.S. Cl.
CPC ....... *B60H 3/0616* (2013.01); *B60H 1/00521* (2013.01); *B60H 1/00535* (2013.01);
(Continued)

(58) Field of Classification Search
CPC .............. B60H 3/0616; B60H 1/00521; B60H 1/00535; B60H 2001/00135;
(Continued)

(56) References Cited

U.S. PATENT DOCUMENTS

2007/0238406 A1 10/2007 Jeong et al.
2018/0361824 A1* 12/2018 Ryu ........................ B60H 1/246
2021/0146752 A1* 5/2021 Lee ..................... B60H 1/00849

FOREIGN PATENT DOCUMENTS

DE 10350399 A1 6/2005
EP 1790509 A1 5/2007
(Continued)

OTHER PUBLICATIONS

English Translation of Hasegawa (Year: 2005).*
(Continued)

*Primary Examiner* — David J Teitelbaum
(74) *Attorney, Agent, or Firm* — Osha Bergman Watanabe & Burton LLP

(57) ABSTRACT

The invention relates to a heating, ventilation and/or air conditioning device (10) for a motor vehicle, comprising a housing (12) defining an air duct (11) for the passage of an airflow comprising—an inlet module (8), comprising at least one air inlet (15, 16), an air filter (70) being arranged within the inlet module (8), and—a distribution module (9) comprising at least one air outlet (27, 29, 30), the inlet module (8) and the distribution module (9) being detachably assembled to one another; according to the invention, the inlet module (8) is configured to be arranged in a first area of the vehicle, and the distribution module (9) is configured to be arranged in a second area of the vehicle, the air filter (70) being able to be removed from the second area of the vehicle. The invention also relates to a motor vehicle comprising such a device.

4 Claims, 2 Drawing Sheets

Figure 3:
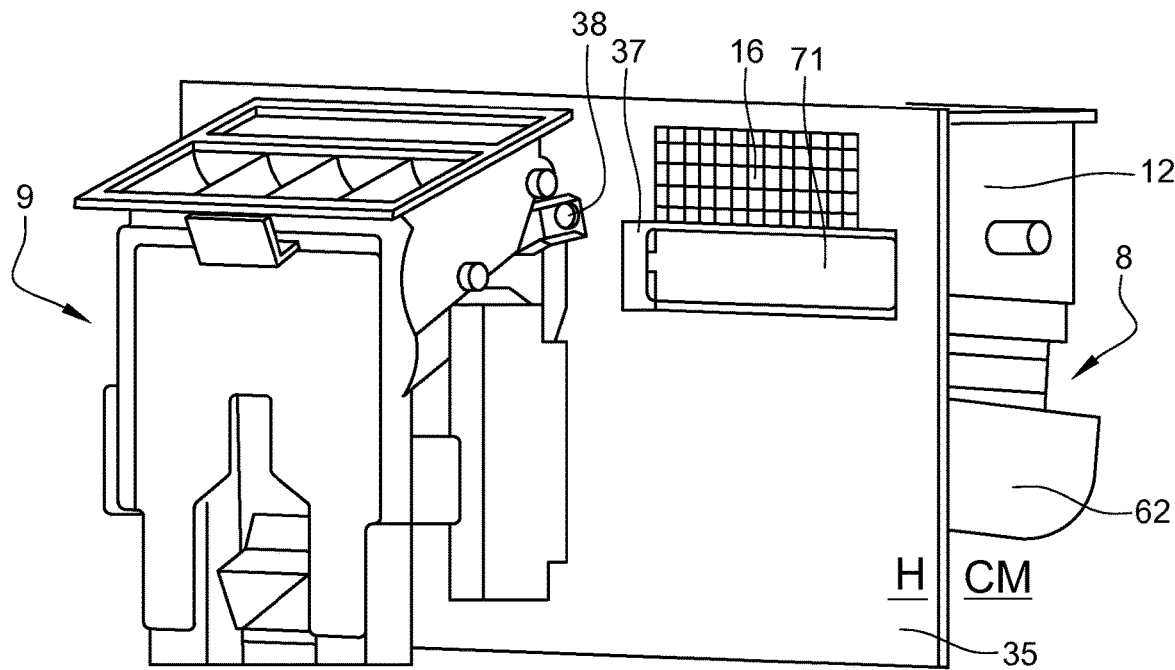

(52) U.S. Cl.
CPC .............. *B60H 2001/00135* (2013.01); *B60H 2001/00185* (2013.01); *B60H 2001/00214* (2013.01)

(58) Field of Classification Search
CPC ........... B60H 2001/00185; B60H 2001/00214; B60H 3/06
See application file for complete search history.

(56) References Cited

FOREIGN PATENT DOCUMENTS

| | | |
|---|---|---|
| EP | 2664472 A1 | 11/2013 |
| EP | 3130492 A1 | 2/2017 |
| EP | 3192682 A2 | 7/2017 |
| JP | H1111143 A * | 1/1999 |
| JP | 2005306165 A * | 11/2005 |
| WO | WO-2015088119 A1 * | 6/2015 ......... B60H 1/00207 |

OTHER PUBLICATIONS

English Translation of Kim (Year: 2015).*
English Translation of Takenawa (Year: 1999).*
International Search Report and Written Opinion in corresponding International Application No. PCT/FR2019/052024, dated Nov. 12, 2019 (14 pages).

* cited by examiner

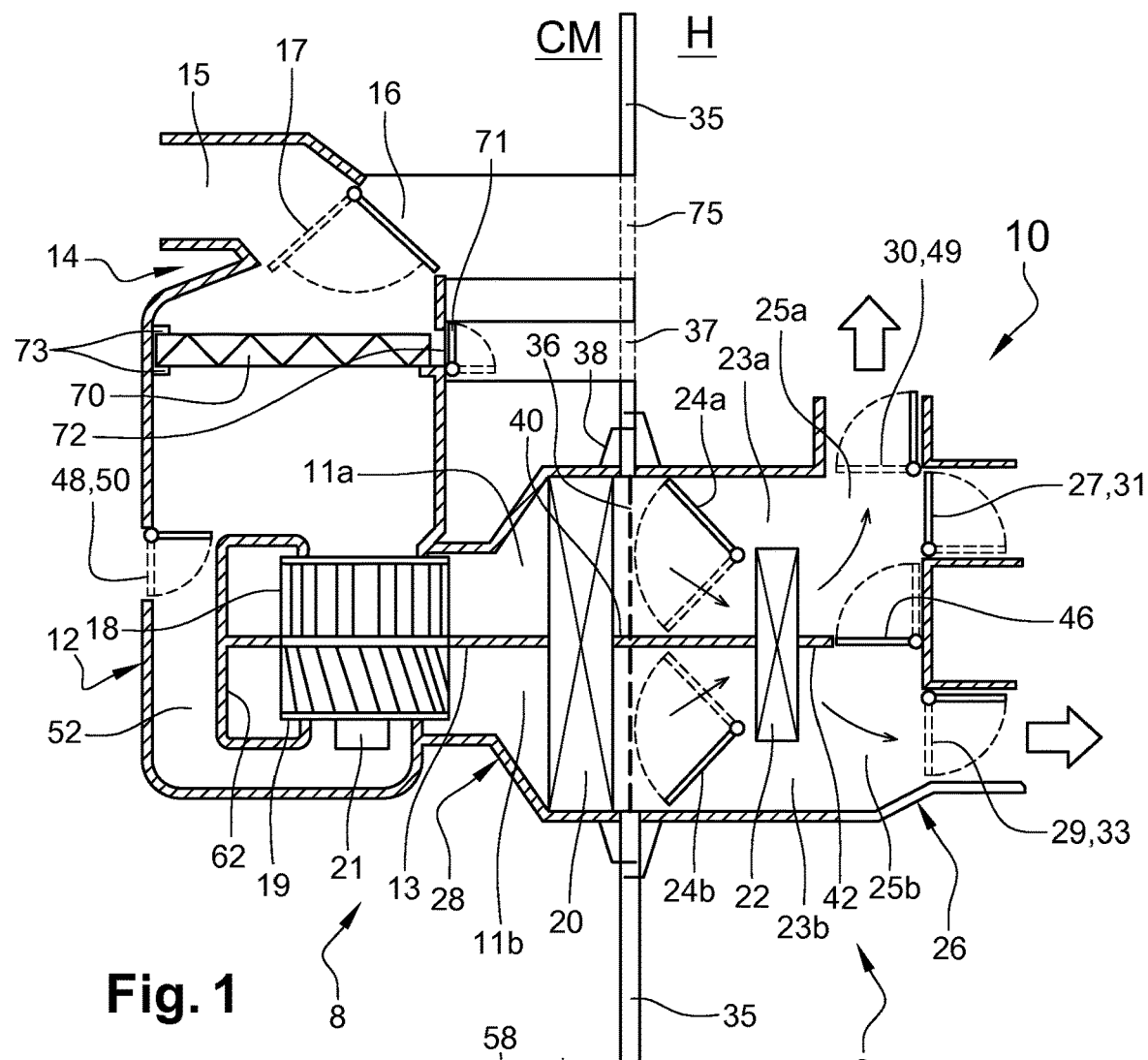
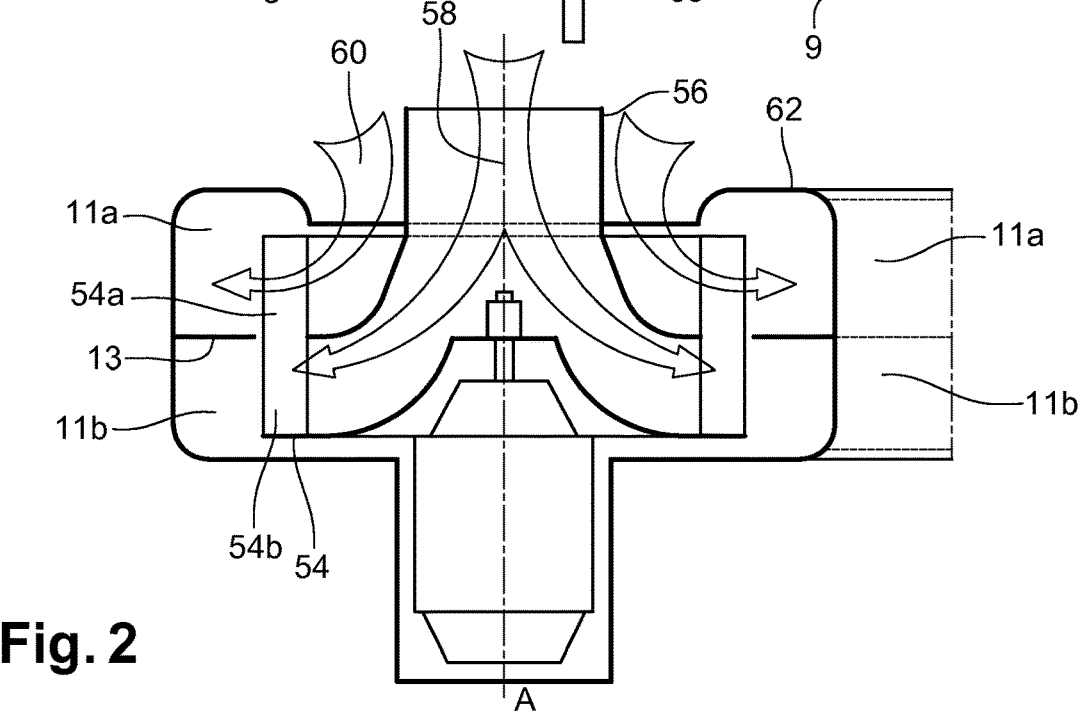

HOUSING FOR A HEATING, VENTILATION AND/OR AIR CONDITIONING DEVICE OF A MOTOR VEHICLE

The invention relates to a housing for a heating, ventilation and/or air conditioning device of a motor vehicle. The invention also relates to the heating, ventilation and/or air conditioning device for a motor vehicle comprising such a housing, as well as to a vehicle comprising such a heating, ventilation and/or air conditioning device.

Motor vehicles are currently equipped with a ventilation, heating and/or air conditioning device for regulating the aerothermal parameters of an air flow distributed toward the inside of the cabin of the vehicle. The device generally comprises a housing demarcated by partitions, in which openings are provided, including at least one air inlet and at least one air outlet. The housing houses an air blower for circulating the air flow from the air inlet to the air outlet. The housing also houses thermal treatment means for heating and/or cooling the air flow prior to its distribution inside the cabin, with this being based on a command set by an occupant of the vehicle. By way of an example, the thermal treatment means, i.e. the heat exchangers, can comprise an evaporator, which is intended to cool and dehumidify the air flow passing therethrough, as well as a radiator, optionally connected to an additional electric radiator, which is intended to heat any air flow that would pass therethrough. Such a housing also comprises a distribution system channeling the air flow into various zones of the cabin, in particular a zone disposed in the vicinity of a windshield of the vehicle and a lower zone, a median zone or an upper zone of the cabin of the vehicle.

The housing of the heating, ventilation and/or air conditioning installation is installed in the cabin, between a dashboard of the vehicle and a wall separating the cabin and an engine compartment of the vehicle. However, for the comfort of the occupants of the vehicle, it is desirable for the internal space of the cabin to be as large as possible. In other words, in order to maintain an acceptable comfort level, it is desirable for the spatial requirement of certain components, for example, the dashboard, to be reduced.

Such a dimensional reduction then makes it impossible to position a heating, ventilation and/or air conditioning installation as known from the prior art.

The quality of the air is also a subject of growing concern. It is important for the heating, ventilation and/or air conditioning devices to provide solutions allowing easy replacement of the air filter.

The subject matter of the invention is to propose a heating, ventilation and/or air conditioning device that is easy to assemble and that can reduce the spatial requirements inside the vehicle, in particular in the vicinity of the dashboard, whilst allowing easy replacement of the air filter.

To this end, the invention proposes a heating, ventilation and/or air conditioning device for a vehicle, comprising a housing defining an air duct for the flow of an air flow comprising:
 an inlet module, comprising at least one air inlet, with an air filter being arranged inside the inlet module; and
 a distribution module, comprising at least one air outlet; the inlet module and the distribution module being assembled together in a detachable manner.

According to the invention, the inlet module is configured to be arranged in a first part of a vehicle, the distribution module is configured to be arranged in a second part of the vehicle, with the air filter being able to be removed from the second part of the vehicle.

Thus, with a detachable attachment between the two, this results in a housing that is easy to assemble and that can reduce the spatial requirements, for example, if a portion of the housing has just been installed in the vicinity of the dashboard and the second portion has been installed in another area of the vehicle with a possibility of easily removing the air filter from one area to the other.

The term detachable in this case means that the modules have a reversible connection, namely that the inlet module and the distribution module can be assembled and disassembled as many times as necessary. Furthermore, the inlet module and the distribution module can be assembled together directly or indirectly, for example, with a partition between the two.

Another embodiment proposes that the housing at least partially comprises:
 a first flow duct for a first air flow;
 a second flow duct for a second air flow; and
 a separation partition arranged inside the housing so as to separate the first flow duct from the second flow duct.

The term separate encompasses several meanings such as isolate, demarcate, space apart, disconnect, dissociate, divide, separate, etc. The idea is that a partition, or a panel, allows a space or a duct to be divided into two sub-spaces or sub-ducts, and that these two sub-sets are independent of each other due to the partition or panel. It also can be said that the partition separates or isolates the two flow ducts from each other.

According to the invention, this heating, ventilation and air conditioning device for a motor vehicle comprising such a housing further comprises a first heat exchanger that is arranged inside the inlet module and a second heat exchanger that is arranged inside the distribution module.

Other embodiments propose that:
 the first heat exchanger is arranged in the first flow duct and in the second flow duct, with said heat exchanger being common to the two flow ducts;
 the device comprises at least one finned wheel, and wherein the housing comprises a blower housing part, in which said at least one finned wheel is arranged, with the separation partition extending inside the housing from the blower housing up to the first heat exchanger;
 the device comprises a second heat exchanger arranged in the first flow duct and in the second flow duct, with said second heat exchanger being common to the two flow ducts, wherein the separation partition extends inside the housing from the blower housing to a zone located downstream in relation to the flow of the air flows of the second heat exchanger.

The invention also relates to a motor vehicle comprising an engine compartment, a cabin, with the engine compartment and the cabin being separated by a panel, and a device as described above, wherein the inlet module and the distribution module are directly assembled together in a detachable manner.

Other embodiments propose that:
 the inlet module and the distribution module are detachably and sealably assembled on the panel, with the panel comprising a first opening for allowing through the air flows Fa, Fb of the thermal treatment mode to the distribution module;
 the inlet module is arranged in the engine compartment and the distribution module is arranged in the cabin, with the panel comprising a second opening to allow a user to access the air filter;
 the second opening also corresponds to an air inlet of the inlet module;

the panel comprises a third opening corresponding to an air inlet of the inlet module.

Of course, the various features, variants and/or embodiments of the present invention can be combined with one another in various combinations, as long as they are not mutually incompatible or mutually exclusive.

Figure 4:
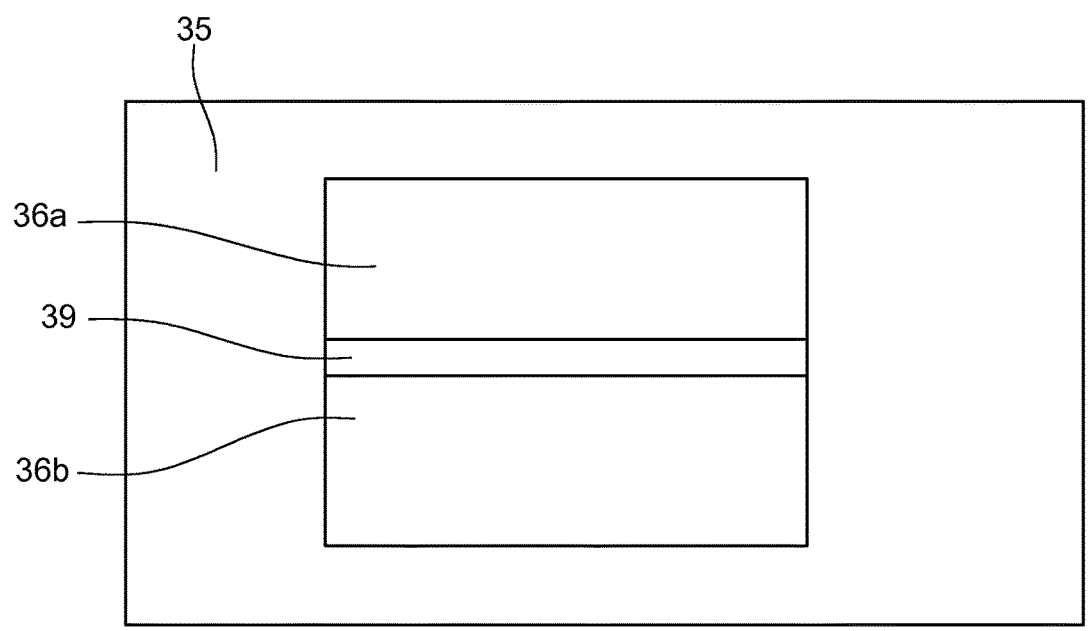

The present invention will be better understood, and further features and advantages will become more apparent, from reading the following detailed description comprising embodiments that are provided by way of an illustration with reference to the accompanying figures, which are provided by way of non-limiting examples, which can be used to supplement the understanding of the present invention and the disclosure of its production and, if applicable, contribute to its definition, in which figures:

FIG. 1 corresponds to a schematic representation of the heating, ventilation and/or air conditioning device according to the invention as a profile view;

FIG. 2 illustrates a section view of part of a blower included in the heating, ventilation and/or air conditioning device;

FIG. 3 corresponds to a representation of the heating, ventilation and/or air conditioning device as a perspective view according to another embodiment;

FIG. 4 illustrates a panel adapted for an embodiment of a heating, ventilation and/or air conditioning device.

It is to be noted that, in the figures, the structural and/or functional elements common to the various embodiments can have the same reference signs. Thus, unless otherwise stated, such elements have identical structural, dimensional and material properties.

According to the present invention, the terms "downstream", "upstream", "in series" and "parallel" describe the position of one component in relation to another component, in the direction of flow of an air flow in a heating, ventilation and/or air conditioning device according to the present invention.

FIG. 1 illustrates a profile view of a heating, ventilation and/or air conditioning device 10 according to the invention comprising a housing 12 with at least one air inlet and one air outlet thus defining a duct, or flow duct, in which at least one air flow circulates. The housing 12 further comprises, inside its internal volume, a separation wall, or partition, 13 in order to define a first flow duct 11a for a first air flow Fa, in other words, in which a first air flow Fa flows that is intended to be thermally treated and to be sent into the cabin of the vehicle, and a second flow duct 11b for a second air flow Fb, in other words, in which a second air flow Fb flows that is also intended to be thermally treated and to be sent into the cabin of the vehicle. The housing 12 incorporates the various elements of the device 10. In other words, the housing 12 comprises a first flow duct 11a so that a first air flow Fa can circulate inside this duct and the housing 12 comprises a second flow duct 11b so that a second air flow Fb, distinct from the first air flow Fa, can circulate inside this duct, with the two flow ducts 11a, 11b being separated by a separation partition 13.

The device 10 comprises an air inlet housing 14 secured to the housing 12. The air inlet housing 14 comprises a first air inlet, or mouth, 15 for introducing a fresh air flow, in other words, an air flow originating from outside the vehicle when the device 10 is installed in a vehicle. The air inlet housing 14 further comprises a second air inlet, or mouth, 16 for introducing a recycling air flow, in other words, an air flow originating from the cabin of the vehicle. A mixing flap 17 is arranged between the first and the second air inlet 15, 16 in order to be able to regulate the fresh air or recycling air flows flowing inside the device 10. The mixing flap 17 is configured to transition from a position in which it shuts-off the first air inlet 15, thus preventing any fresh air from entering inside the device 10, to a position where it shuts-off the second air inlet 16, as illustrated in FIG. 1, thus preventing any recycling air from entering inside the device 10. Of course, the mixing flap 17 is able to adopt any intermediate position.

The device 10 comprises means able to blow the air, i.e. means conveying one or more air flows, commonly called a blower (or motor-fan unit). These means comprise, for example, a first finned wheel 18 mounted in the first flow duct 11a and able to generate a first air flow Fa, and a second finned wheel 19 mounted in the second flow duct 11b and able to generate a second air flow Fb, with these two wheels 18, 19 being able to be driven, individually or together, by an electric motor 21.

The heating, ventilation and/or air conditioning device 10 further comprises heat exchangers for heating and/or cooling said air flow prior to its distribution inside the cabin, according to the instructions from the occupants of the vehicle. By way of an example, the thermal treatment means, i.e. the heat exchangers, can comprise a first heat exchanger 20, which will be called the evaporator 20 hereafter, intended to cool and dehumidify the air flow passing therethrough, as well as a second heat exchanger 22, which will be called the radiator 22 hereafter, optionally connected to an additional electric radiator, intended to heat any air flow passing through one or both of them. As illustrated in FIG. 1, each heat exchanger 20, 22 is arranged in the first flow duct 11a and in the second flow duct 11b, with each heat exchanger 20, 22 being common to the two flow ducts 11a, 11b. The device 10 further comprises a first bypass path 23a for the radiator 22 arranged in the first flow duct 11a and a second bypass path 23b for the radiator 22 arranged in the second flow duct 11b.

A mixing flap 24a, 24b is arranged in each flow duct 11a, 11b. Each mixing flap 24a, 24b is able to transition from a configuration in which it shuts-off the bypass path 23a, 23b, as illustrated in FIG. 1, with the entirety of each air flow Fa, Fb then passing through the radiator 22, to a configuration in which it prevents the air flow Fa, Fb from passing through the radiator 22, with the entirety of each air flow Fa, Fb then passing through the bypass path 23a, 23b. Of course, each mixing flap 24a, 24b is able to adopt any intermediate position.

According to one embodiment, not shown, the heating, ventilation and/or air conditioning device can further comprise a bypass path for the evaporator arranged in each flow duct.

Each flow duct 11a, 11b further comprises a mixing zone 25a, 25b where the hot and cold air flows Fa, Fb that have respectively passed through the radiator 22 and/or the evaporator 20 are mixed in variable proportions, then routed toward the nozzles, or mouths, of outlets emerging in different zones of the cabin.

The device 10 in this case comprises three outlet mouths 27, 29, 30, with each being provided with a shut-off flap 31, 33, 49 for shutting-off or not shutting-off said outlet mouth. The first flow duct 11a for an air flow Fa comprises two outlet mouths 27, 30, more specifically an outlet mouth 30, connected to a shut-off flap 49, conveying the air flow Fa toward the defrosting nozzle, thus allowing the windshield to be demisted, and an outlet mouth 27, connected to a shut-off flap 31, conveying the air flow Fa toward the lateral/central ventilation nozzle, thus allowing the passengers of the vehicle to be cooled/heated. The second flow duct 11*b* for an air flow Fb comprises an outlet mouth 29, connected to a shut-off flap 33, orienting the air flow Fb toward the foot nozzle, thus allowing the feet of the front passengers of the vehicle to be heated.

According to one embodiment, not shown, a possibility can be provided for thermally managing the various zones of the vehicle in an independent manner, in particular for the top-of-the-range vehicles. To this end, the housing 12 can comprise an additional outlet mouth at a flow duct 11*a*, 11*b* intended to aerate other zones of the cabin, such as the passengers in the rear of the vehicle.

As previously established, the heating, ventilation and/or air conditioning device 10 can be fed either with fresh air or with recycling air. Depending on the operating conditions, it can be of particular interest to use fresh air so that it can be introduced into the cabin at the defrosting nozzles located close to the windshield, after heating through the heating, ventilation and/or air conditioning device and, conversely, to use the recycling air in order to discharge it into the cabin at the foot nozzles. In order to guarantee this separation between the outside and recycled air flow, whilst being able to select or adjust the type of air to be delivered as well as possible, at least one separation partition 13 is arranged inside the housing 12.

The two flow ducts 11*a*, 11*b* are separated by a first separation partition 13, in a zone located upstream, between and directly downstream of the finned wheels 18, 19. The first separation partition, or wall, 13 extends up to the first heat exchanger 20, more specifically, the first separation partition 13 comes close to the first heat exchanger 20, namely said separation partition 13 may or may not come into abutment against the evaporator 20. The device 10 can further comprise a second separation partition 40 arranged between the two heat exchangers 20, 22 and separating, or demarcating, the two flow ducts 11*a*, 11*b* from each other. Said separation partition 40 may or may not come into abutment against each heat exchanger 20, 22. The device 10 can further comprise a third separation partition 42 arranged downstream of the second heat exchanger 22 and separating, or demarcating, the two flow ducts 11*a*, 11*b*. A flap 46 can be arranged on one of said separation partitions 13, 40, 46 in order to allow an air flow Fa, Fb to transition from one flow duct 11*a*, 11*b* to another. As illustrated in FIG. 1, the flap 46 is mounted at the downstream end of the third separation partition 42. Of course, the flap 46 could be arranged on the first or the second separation partition 13, 40.

The portion of the housing 12 in which the second heat exchanger 22 and the outlet mouths 27, 29, 30 are arranged is commonly called the distribution 26.

As illustrated in FIG. 1, the air inlet housing can comprise a third air inlet, or mouth, 48 for introducing a recycling air flow. The air inlet 48 is connected to a flap 50. The flap 50 can transition from an extreme position, where it shuts-off the air inlet 48; in this case, the second finned wheel 19 can be fed with fresh air and/or with recycling air originating from the air inlets 15, 16, depending on the position of the mixing flap 17, via a passage 52. The flap 50 can transition to another extreme position, where the passage 52 is shut-off and the second finned wheel 19 is then exclusively fed with recycling air originating from the air inlet 48. It is then possible to contemplate all the operating modes, namely 100% fresh air, with the second and third air inlets 16, 48 being shut-off by their associated flaps 17, 50, 100% recycling air, with the first air inlet 15 being shut-off by the mixing flap 17, and 50/50 mixed air, with the second inlet 16 being shut-off by the mixing flap 17.

According to another embodiment, the device 10 can comprise an air inlet housing 14 and a blower (or motor-fan unit) as illustrated in FIG. 2, namely with a single turbine, in other words, a finned wheel 54 able to be rotated about an axis A. The device 10 comprises a tubular component 56 able to demarcate a first air circulation channel 58 allowing the flow of a first air flow intended to pass through a first axial part of the turbine 54*b* and a second air circulation channel 60 allowing the flow of a second air flow intended to pass through a second axial part of the turbine 54*a*. The tubular component 56 is mounted at the site of a first end of said turbine 54 and demarcates an internal space, or volume, forming at least one part of the first air circulation channel 58, with the second air circulation channel 60 extending outside the tubular component 56. The device 10 further comprises an air inlet housing 14 covering the first end of the turbine 54 and the tubular component 56. The air inlet housing 14 comprises guidance means able to direct a first air flow into the first air circulation channel 58, and able to direct a second air flow into the second air circulation channel 60. The axial parts of the turbine 54*a*, 54*b* can be made, for example, with reference to the vertical axis of the vehicle, when the device 10 is installed in the vehicle.

To this end, the air inlet housing 14 can comprise, for example, a first and a second air inlet mouth 15, 16, one for the recycling air and one for the fresh air, and three drum flaps with coaxial axes of rotation. The central drum flap is arranged to allow aeraulic communication between the air inlet mouths 15, 16 and the first air circulation channel 58. The two lateral drums are arranged to allow aeraulic communication between the air inlet mouths 15, 16 and the second air circulation channel 60. The air inlet housing 14 further comprises an air filter 70 intended to be passed through by the first and the second air flow.

The turbine 54 is arranged in a blower housing 62, the outlet of which comprises the two flow ducts 11*a*, 11*b* separated by the partition wall 13. In other words, the first air circulation channel 58 orients the air flow toward a first axial part of the turbine 54*b* and thus emerges in the second flow duct 11*b*, whereas the second air circulation channel 60 orients the air flow toward the second axial part 54*a* of the turbine 54 and thus emerges in the first flow duct 11*a*.

The air blower, i.e. the one or more finned wheels 18, 19, 54 is contained in a spiral shaped portion of the housing 12, commonly called blower housing 62. The air flows drawn in by the one or more finned wheels 18, 19, 54 are oriented toward the walls of the blower housing 62 and thus conform to the circular trajectory defined by these walls. The blower housing 62 has a radial evolution starting from a point, called tip, of the blower housing, over an angle θ range that is generally 360°. The blower housing 62 subsequently has a blower housing outlet in the form of a straight duct so that the air flows exiting the blower housing 62 follow this same direction.

This part of the housing 12 positioned between the outlet of the blower housing 62 and the distribution 26 is commonly called the divergent 28. The divergent 28 corresponds to a channel, in which the air flow exiting the blower housing 62 is routed up to the first heat exchanger, in this case the evaporator 20. With the evaporator 20 generally being higher than the air blower and the blower housing 62, the divergent 28 has an extension, in relation to the blower housing 62, over its height and/or over its width.

As illustrated in FIG. 1, the heating, ventilation and/or air conditioning device 10 is separated, or demarcated, into two parts along an axis, which can be the vertical axis when the device 10 is installed in a motor vehicle, to such an extent that a first module is distinguished, namely the inlet module 8. The inlet module 8 comprises the air inlet housing 14, therefore the air inlets 15, 16, 48, the blower housing 62, the divergent 28 and the first heat exchanger 20, and therefore the part of the housing 12 supporting the evaporator 20. A second module is distinguished, namely the distribution module 9. For its part, the distribution module 9 comprises the distribution 26, namely the part of the housing 12 where the radiator 22 and the outlet mouths 27, 29, 30 are arranged, as previously explained. According to a particular non-limiting embodiment, the inlet module 8 and the distribution module 9 are two distinct and separate sub-assemblies of the heating, ventilation and/or air conditioning device 10.

The invention is not limited to these precise embodiments in the sense that the distribution module 9 could also comprise the evaporator 20.

The inlet module 8 and the distribution module 9 are assembled or fixed together in a detachable manner. To this end, the inlet module 8 and the distribution module 9 can comprise attachment means 38 that are reversible and have matching shapes, such as clips, threaded screws/nuts, bolts, etc., with a female part being arranged on the inlet module 8 and the corresponding male part being arranged on the distribution module 9, or vice versa. It also can be said that the device 10 comprises sealed and reversible connection means 38.

As illustrated in FIG. 1, the motor vehicle comprises a panel 35, also called a firewall. The panel 35 corresponds to a wall, or partition, separating, or demarcating, the cabin H and the engine compartment CM, as illustrated in FIG. 1. In other words, the panel 35 can adopt the shape of a sheet extending substantially vertically between a floor and a front windshield of the vehicle. The cabin H corresponds to the part of the vehicle where the driver and passengers are located and the engine compartment CM corresponds to the part of the vehicle where an engine, an inverter, or even computers are located.

As illustrated in FIG. 1, the panel 35 corresponds to the boundary between the distribution module 9 and the inlet module 8, where the inlet module 8 is arranged in the engine compartment CM and the distribution module 9 is arranged inside the cabin H. To this end, the panel 35 comprises at least one opening 36 to allow the air flows Fa, Fb to flow inside their respective flow duct 11*a*, 11*b* from one module 8, 9 to the other. Such an arrangement is particularly advantageous, since the noise pollution generated by the blower and the condensates generated on the evaporator 20 can be discharged without entering the cabin H, thus reducing the discomfort of the passengers. More specifically, the inlet module 8 and the distribution module 9 are connected together by attachment means 38 at the opening 36, whilst being in aeraulic communication.

According to one embodiment, not shown, it is possible to design, according to the invention, a device where the inlet module 8 is arranged in the cabin and the distribution module 9 is arranged in the engine compartment, with the panel 35 comprising a second opening to allow a user to access the air filter. However, additional openings will need to be provided in the panel 35 and optionally additional ducts will need to be provided for routing the thermally treated air flow from the distribution module 9 to the cabin, as well as from the outside to the inlet module 8.

According to an alternative embodiment, the inlet module 8 and the distribution module 9 can comprise attachment means 38 in order to be assembled to the panel 35. For example, the panel 35 can comprise a docking strip arranged around the opening 36 and against which the modules 8, 9 come into abutment. In other words, the device 10 is secured to the panel 35 using attachment means 38, or even securing means, that are intended for this purpose. By way of an example, the distribution module 9 can comprise one or more attachment tabs, screws, clips, or even hooks, allowing attachment onto the panel 35. Similarly, the inlet module 8 can comprise one or more attachment tabs, screws, clips, or even hooks, allowing attachment onto the panel 35, as illustrated in FIG. 3. Indeed, as illustrated in FIG. 3, the distribution module 9 in this case comprises an attachment tab comprising a tapping, in which a screw with a threaded rod is introduced, with the panel 35 also comprising a through or non-through tapping to allow form-fitting engagement between the end of the threaded rod and a nut.

According to the invention, the inlet module 8 comprises a filtration device and, more specifically, an air filter 70. The air filter 70 comprises a filtering medium corresponding to a set of folded layers, optionally with a rigid or flexible frame at least partially surrounding the filtering medium. The air filter 70 is arranged between the air inlets 15, 16 and the blower. In order to allow easy replacement of the air filter 70, the housing 12 comprises an opening 72 allowing the introduction and the removal of the air filter 70, as well as a detachable or movable hatch 71, corresponding to a door or panel, shutting-off this opening 72 made inside the housing 12, with this allowing a user to easily access the air filter 70 from outside the device 10 in order to proceed with its replacement. The housing 12, in particular the air inlet housing 14, can also comprise supports 73, for example, ribs, in order to support the air filter 70 and hold it in place.

As previously explained, the device 10 according to the invention allows, due to the configuration and the arrangement of the inlet 8 and distribution 9 modules, a user to replace the air filter 70 from the cabin H. To this end, the panel 35 comprises a second opening 37 that is the same size or is bigger than the hatch 71, thus allowing a user to access the hatch 71 and therefore the air filter 70. According to the embodiment illustrated in FIG. 1, the panel 35 can comprise a third opening 75 corresponding to the second air inlet 16, allowing a recycling air flow to be introduced into the heating, ventilation and/or air conditioning device 10 via a duct. According to the embodiment illustrated in FIG. 3, the second opening 37 is bigger than the hatch 71 and thus corresponds to the second air inlet 16 and to the opening granting access to the hatch 71. In other words, the duct guiding the recycling air to the blower and the duct guiding the user to the hatch 71 meet and are coincident at the second opening 37. The air inlet 16 comprises a grill preventing any external solid bodies from entering into the device 10.

This arrangement is particularly adapted for a heating, ventilation and/or air conditioning device of the semi-centered type, where the evaporator 20 and the distribution 26 are in the same longitudinal axis, whereas the inlet housing 14 and the blower are arranged laterally, thus making the air filter 70 more accessible.

According to another embodiment, the panel 35 as illustrated in FIG. 4 can further comprise, at the first opening 36, two sub-openings 36*a*, 36*b*, with a beam 39 arranged between the two so as to demarcate the two sub-openings 36*a*, 36*b*. One of the separation partitions 13, 40, 42 thus can come into abutment on this beam 39, to this end the beam 39 can comprise reception means, such as a slot or a groove, into which said partition can be introduced. Thus, the first sub-opening 36*a* can be dedicated to the first flow duct 11*a* and the second sub-opening 36*b* can be dedicated to the second flow duct 11*b*.

According to another embodiment, not shown, the heating, ventilation and/or air conditioning device, in particular the housing, can comprise soundproofing means or even an acoustic absorption means. To this end, the housing can comprise a coating made of a porous material or of a woven or non-woven material made up of different fibers. The walls of the housing also can be made from these soundproofing materials.

According to another embodiment, not shown, the heating, ventilation and/or air conditioning device can further comprise a sensor for detecting particulate matter. Said sensor for detecting particulate matter comprises at least one first orifice defining a first air inlet for an air flow, called outside air flow, and a second orifice defining a second air inlet for an air flow, called recycling air flow, with said air inlet for the outside air flow and the inlet for the recycling air flow being separate from each other. Said sensor for detecting particulate matter can be arranged at the air inlet housing or even at the distribution.

The invention as described above is not limited to the means and configurations exclusively described for a particular embodiment, and also applies to all combinations of these means or configurations, as well as to equivalents and to any combination of such means or configurations with the equivalents.

The invention claimed is:

1. A motor vehicle comprising:
   an engine compartment; and
   a cabin with the engine compartment and the cabin being separated by a panel; and
   a device comprising a housing defining an air duct for the flow of an air flow, the housing comprising:
      an inlet module comprising at least one air inlet, with an air filter being arranged inside the inlet module; and
      a distribution module, comprising at least one air outlet;
         the inlet module and the distribution module being assembled together in a detachable manner,
      wherein the detachable manner is characterized by an attachment means connecting the inlet module and the distribution module, the attachment means selected from a group consisting of: clips, threaded screws, threaded bolts and nuts, and corresponding male and female parts arranged on each of the inlet module and the distribution module,
      wherein the inlet module is configured to be arranged in a first area of a vehicle, the distribution module is configured to be arranged in a second area of the vehicle, with the air filter being able to be removed from the second area of the vehicle,
      wherein the inlet module and the distribution module are detachably and sealably assembled to the panel, the panel comprising a first opening for allowing through the air flows originating from the inlet module inside the distribution module.

2. The motor vehicle as claimed in claim 1, wherein the inlet module is arranged in the engine compartment and the distribution module is arranged in the cabin, the panel comprising a second opening to allow a user to access the air filter.

3. The motor vehicle as claimed in claim 2, wherein the second opening also corresponds to the at least one air inlet of the inlet module.

4. The motor vehicle as claimed in claim 2, wherein the panel comprises a third opening corresponding to the at least one air inlet of the inlet module.

* * * * *